(12) United States Patent
Lima et al.

(10) Patent No.: US 9,292,971 B2
(45) Date of Patent: Mar. 22, 2016

(54) THREE-DIMENSIONAL TACTICAL DISPLAY AND METHOD FOR VISUALIZING DATA WITH A PROBABILITY OF UNCERTAINTY

(75) Inventors: Kenneth M. Lima, Jamestown, RI (US); Richard R. Shell, Riverside, RI (US); Todd P. Drury, Bristol, RI (US); Douglas B. Maxwell, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1784 days.

(21) Appl. No.: 12/462,938

(22) Filed: Aug. 3, 2009

(65) Prior Publication Data

US 2011/0025684 A1  Feb. 3, 2011

(51) Int. Cl.
*G09G 5/02* (2006.01)
*G06T 19/00* (2011.01)
*G01S 7/62* (2006.01)
*G01S 15/02* (2006.01)

(52) U.S. Cl.
CPC .............. *G06T 19/00* (2013.01); *G01S 7/6245* (2013.01); *G01S 15/025* (2013.01)

(58) Field of Classification Search
None
See application file for complete search history.

(56) References Cited

U.S. PATENT DOCUMENTS

| 7,020,046 | B1 * | 3/2006 | Baylog et al. | 367/124 |
| 2009/0087029 | A1 * | 4/2009 | Coleman et al. | 382/103 |

OTHER PUBLICATIONS

Yanshen Zhu, Serge Sala-Diakanda, Luis Rabelo, Jose Sepulveda, Maria Bull, "Integration of Underwater Sonar Simulation with a Geographical Information System", Proceedings of the 39th conference on Winter simulation: 40 years! The best is yet to come, Dec. 9-12, 2007, p. 1378-1386.*

Donna W. Blake, John R. Hummel, "Establishing Human Performance (Decision Making) and Natural Environment Consistency Across Integrated Naval Simulations", 72nd MORS Symposium,Working Group 10, Jun. 23, 2004.*

* cited by examiner

*Primary Examiner* — Weiming He
(74) *Attorney, Agent, or Firm* — James M. Kasischke; Jean-Paul A. Nasser; Michael P. Stanley

(57) ABSTRACT

A feeder program is utilized for collecting and reading in and maintaining a time synchronization for combat fire solutions which may include threat containment regions. The threat containment regions are defined in terms of a probability of at least one threat being located therein. A three-dimensional viewer program displays bathometry information, an own-ship relative position relative to said bathometry information, and determines what portions of said plurality of threat containment regions and said tracking and position information are to be displayed based on an angle of a view.

1 Claim, 1 Drawing Sheet

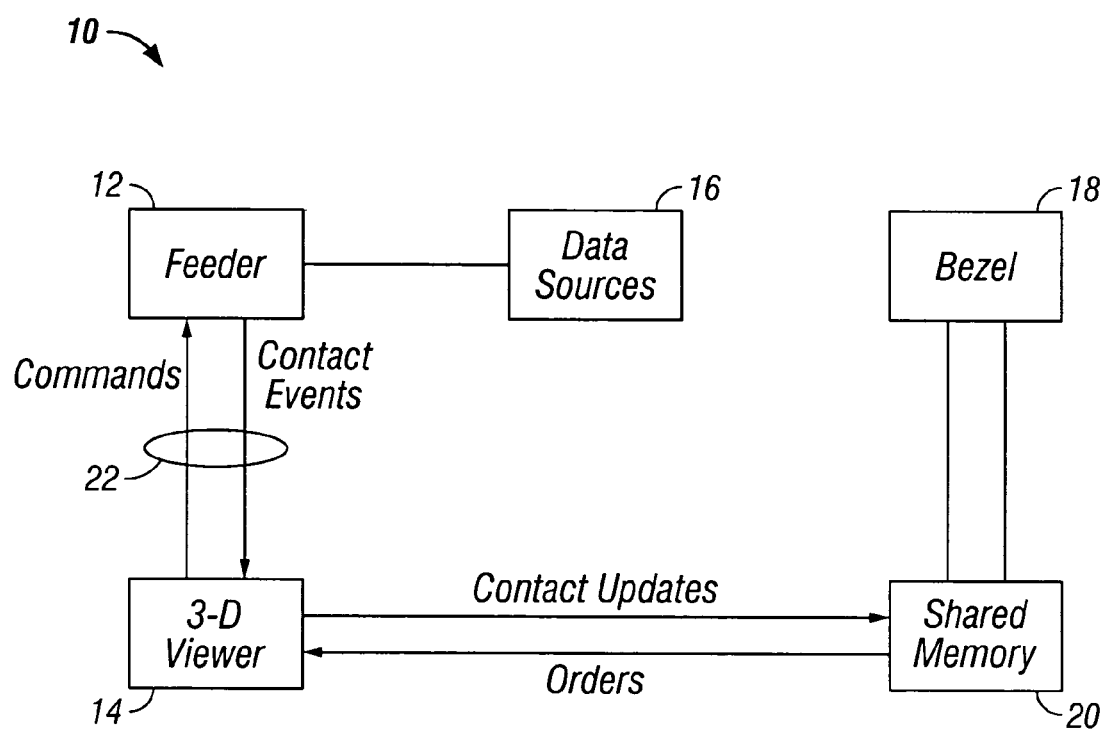

THREE-DIMENSIONAL TACTICAL DISPLAY AND METHOD FOR VISUALIZING DATA WITH A PROBABILITY OF UNCERTAINTY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to three dimensional displays. In one possible embodiment, the invention is directed to an undersea tactical display that may be utilized to display uncertain data.

2. Description of the Prior Art

Displays of many different types are well known. However, prior art displays are less suitable for the types of tactical information that may be needed for use in a submarine.

Within a submarine, tracking data is available from a wide variety of sources for tracking various tactical objects. However, the tracking data may often be based on sonar signals and/or other contact information that may be highly sporadic or somewhat sporadic, non-definitive, and/or otherwise incomplete. This type of information does not necessarily provide the ideal real-time tracking of the actual location of some or many of these objects. Instead, the information may often be considered in terms of a probability analysis that includes regions, which might be referred to as areas of uncertainty (AOU). As possible examples, the area of uncertainty for a threat may initially be a large region due to limited contact information, or may initially be defined at a precise location, but then change in size and shape due to lack of subsequent contact information and/or inadequate information about heading, type of vessel, speed, speed capabilities, and other such information.

The volume in which a threat is presumably located may sometimes be referred to as a threat containment region or AOU. In terms of a probability analysis, as this volume becomes larger, then the probability of the target actually being within this volume increases. However, if one wishes to obtain a 100% probability that a target is within a given threat containment region, then the threat containment region may be quite large. This makes the information more difficult to visualize as multiple moving targets, with multiple threat containment regions that are varying in shape, and perhaps have different probabilities associated therewith.

To attempt to visualize movement of multiple targets in multiple threat containment regions has been problematic. When viewing a surface vessel, the threat containment region for a particular threat may be largely undefined but may still presumably be considered substantially two-dimensional. However, the display problem for submarines is further exacerbated in the underwater region where multiple targets are underwater targets and require tactical consideration within three-dimensional threat containment regions that may be affected by the viewer's perspective. The combination of multiple moving two-dimensional and three-dimensional targets provides further complications.

It will be understood herein that AOUs or areas of uncertainty or threat containment regions may refer to either two-dimensional or three-dimensional regions, or more typically the combination thereof, and that the terms are used interchangeably herein.

The following U.S. Patents describe various prior art tracking and/or display systems:

U.S. Pat. No. 3,996,590, issued Dec. 7, 1976, to Hammack, discloses an improvement in the art of navigating, detecting and tracking moving objects, position finding, mapping and such subjects employing a plurality of stations and variational measurements.

U.S. Pat. No. 5,313,201, issued May 17, 1994, to Ryan, discloses a vehicular display that includes a three-dimensional representation of a moving host vehicle fixed at a stationary point on the screen, and dynamic representations of objects located within a predetermined distance of the host vehicle in locations proportional and scaled to their respective distances and locations from the host. The display plots the trajectories of these objects and classifies them according to probability of collision, warning the user if collision is imminent. The display also includes a variety of navigational aids, including heading lines, compass indications, and various non-alphanumeric indicators. Both the hardware and software used in the system are of the type which may be provided on small civilian craft, in addition to replacing the more complex and less intuitive displays presently provided in such contexts as commercial aircraft, marine vehicles, and air traffic control systems. The display also may be adapted for use in outer space.

U.S. Pat. No. 5,936,552, issued Aug. 10, 1999, to Wichgers et al, discloses a visual display format for a terrain situational awareness system comprising a horizontal terrain elevation view and a profile terrain elevation view of potential terrain hazards integrated onto a single display.

U.S. Pat. No. 5,995,882, issued Nov. 30, 1999, to Patterson et al, discloses an autonomous underwater vehicle system for ocean science measurement and reconnaissance that is about six feet long and 13 inches in diameter and includes various improvements which make turn-key, networkable, autonomous or tethered operation in aquatic environments possible. The improvements include a platform independent computer and I/O architecture which permits use of CISC or RISC CPUs and turn-key vehicle operation by persons unversed in computer programming, a floating launch and recovery frame which protects the vehicle and also provides for correct and safe vehicle assembly, an external battery charging port and high speed serial port with provision for optional control of the vehicle and data acquisition in real-time through connection of a lightweight electrically conducting tether, a four part hull assembly including an integrated strobe and antennae tower on the forward hull section which emerges from the water when the vehicle is at the surface, a modular, removable nose cone to carry sensors, and a motor mount which protects the main hull from flooding in the event of thruster failure, and flexible control surfaces with dive planes located on the forward hull and rudder fins on the stern hull section. These features are combined to produce a versatile and flexible platform for making oceanographic observations during complex behaviors executed by the vehicle and for providing duplex computer network connections when the vehicle is at the surface.

U.S. Pat. No. 6,195,184, issued Feb. 27, 2001, to Chao et al, discloses a real-time, dynamic, free space-virtual reality, 3-D image display system which is enabled by using a unique form of Aerogel as the primary display media. A preferred embodiment of this system comprises a 3-D mosaic topographic map which is displayed by fusing four projected hologram images. In this embodiment, 4 holographic images are projected from 4 separate holograms. Each holographic image subtends a quadrant of the 4.pi. solid angle. By fusing these four holographic images, a static 3-D image such as a featured terrain map would be visible for 360 degrees in the horizontal plane and 180 degrees in the vertical plane. An input, either acquired by 3-D image sensor or generated by computer animation, is first converted into a 2-D computer generated hologram (CGH). This CGH is then downloaded into large liquid crystal (LC) panel. A laser projector illuminates the CGH-filled LC panel and generates and displays a real 3-D image in the Aerogel matrix.

U.S. Pat. No. 6,285,317, issued Sep. 4, 2001, to Ong, discloses a navigation system for a mobile vehicle includes a vehicle position data generator for generating signals indicating location of the mobile vehicle, and scene information provider which generates information representative of the layouts of local environs at various locations and a display. A real environment scene generator, using position data acquired from the vehicle position data generator, acquires information from the local scene information provider representative of the local scene at the vehicle position indicated by the position data. The real environment scene generator generates location pertinent information which is used by the display to display a scene depicting the locality setting in a three dimensional format. The real environment scene generator also generates direction information which is used to display directions overlaid on the displayed local scene. The displayed scene and overlaid directions are constantly updated to reflect the changing locality as the position of the vehicle changes.

U.S. Pat. No. 6,385,514, issued May 7, 2002, to Tarr, discloses data on influencing signatures of world-wide sea mine models that is collected on board a host sea vessel and undergoes periodic updating to maintain accuracy of the display on vessel vulnerability to such sea mines, obtained onboard from such collected data, measurements of current status conditions of the host vessel and calculation therefrom of surface actuation onsets with respect to each of the sea mine models.

U.S. Pat. No. 6,392,661, issued May 21, 2002, to Tankersley, discloses an apparatus and process for arranging and presenting situational awareness information on a computer display screen using maps and/or other situational awareness information so that greater amounts of relevant information can be presented to a user within the confines of the limited area on small computer screen displays. The map display layout for a screen display utilizes multiple, independent map displays arranged on a computer screen in order to maximize situational awareness information and display that information efficiency. By displaying single or multiple maps in a plurality of range bands arranged along the peripheral area of a display screen, wasted screen area is minimized. The ability to independently scale with respect to distance, time and velocity, as well as zoom and pan each map on the screen display further improves the display presentation. When connected to a communication network, the ability of the screen display to project real time images and the movement of objects further enhances the delivery of situational awareness information to the user.

U.S. Pat. No. 6,778,906, issued Aug. 17, 2004, to Hennings et al, discloses a preferred embodiment of the first aspect of the present invention relates to an apparatus for Active Network Guidance and Emergency Logic (ANGEL). ANGEL is a computer based program designed to function preferably in the mission computer on a vehicle, preferably an aircraft The program is preferably installed as part of an aircraft's Operational Flight Program (OFP) card(s) in the mission computer. ANGEL new versions and updates can be installed along with OFP updates. A second aspect of the present invention is a method for integrating and interacting with vehicle subsystems and controller subsystems, to prevent mishaps and accidents during a mission. ANGEL can prevent aircrew and aircraft problems by providing cueing or automation of emergency tasking, displaying procedures for aircrew to respond in emergency situations and providing assistance to an incapacitated pilot. In addition, ANGEL improves aircrew and aircraft survivability by reducing susceptibility to air to air and ground to air threats, reducing controlled flight into terrain and midair collisions and aiding in successful ejection from unrecoverable aircraft.

U.S. Pat. No. 6,819,984, issued Nov. 16, 2004, to Beckman et al, discloses a system for the accurate determination of the position of an underwater vehicle comprising a system observer subsystem having a state velocity update module, a terrain matching module, means for generating a prediction of the terrain matching module's performance and a constrained extended Kalman filter subsystem. The constrained extended Kalman filter subsystem includes a steady state extended Kalman filter, a non-linear constraint module, and a state predictor. The system observer integrates bathymetry data corresponding to the area of the submersible vehicle, with the vessel's measured ocean depth, the vessel's predicted state, the vessel's measured velocity into a terrain based state estimate, a final predicted state, the Kalman filter takes the terrain based state estimate, the final predicted state, the measured slant range and the location of the known point and computes the final estimate of the vessel's position and a prediction of the vessel's position at the next time step. A method for the accurate determination of the position of at least one underwater vehicle comprising the steps of (1) acoustically coupling at least one underwater vehicle to a sea borne position marker having a known position; (2) predicting the at least one underwater vehicle's position, based on a past estimate of the underwater vehicle's position, and an estimate of its velocity over the sea bottom; (3) estimating the underwater vehicle's position utilizing measured ocean depth at the underwater vehicle's position, bathymetry data and the underwater vehicle's predicted position in a single point terrain match; (4) computing a estimate of the underwater vehicle's position based on the prediction of the at least one underwater vehicle's position based on vehicle dynamics and the estimated underwater vehicles position based on ocean depth and bathymetry data; and (5) computing a corrected estimate of the at least one submersible vehicle's position that utilizes the estimate of the underwater vehicle's position and a measured slant range from the at least one submersible vehicle to the sea borne position marker whose position is known.

U.S. Pat. No. 6,836,285, issued Dec. 28, 2004, to Lubard et al, discloses a LIDAR subsystem or other means at an elevated position that emits thin fan-beam light pulses at a shallow angle, and detect reflected portions of the pulses at a like angle; a streak-tube subsystem or other means image successive reflected portions to detect objects, for example near a water craft if the elevated position is on such a craft (e.g., a mast or high bridge). In some aspects, the imaging means perform the imaging in a way that tightly localizes reflection from a water surface near the objects, to facilitate detecting the objects despite proximity to the surface. Some preferred embodiments apply a correction for energy reduction, or depth errors, near lateral ends of the fan beam; a lenslet array is preferred for applying the correction. Preferably the shallow angle is in a range of approximately one to fifteen degrees, more preferably approximately two to ten degrees, ideally roughly five degrees.

U.S. Pat. No. 6,885,939, issued Apr. 26, 2005, to Schmidt et al, discloses a system providing three-dimensional visual navigation for a mobile unit includes a location calculation unit for calculating an instantaneous position of the mobile unit, a viewpoint control unit for determining a viewing frustum from the instantaneous position, a scenegraph manager in communication with at least one geo-database to obtain geographic object data associated with the viewing frustum and generating a scenegraph organizing the geographic object data, and a scenegraph renderer which graphically renders the scenegraph in real time. To enhance depiction, a method for blending images of different resolutions in the scenegraph reduces abrupt changes as the mobile unit moves relative to the depicted geographic objects. Data structures for storage and run-time access of information regarding the geographic object data permit on-demand loading of the data based on the viewing frustum and allow the navigational system to dynamically load, on-demand, only those objects that are visible to the user.

U.S. Pat. No. 6,952,001, issued Oct. 4, 2005, to McKendree et al, discloses a system and method of providing situational awareness and weapon targeting is presented. The method includes determining the location of one or more enemy sites and one or more friendly sites. A "Do Not Engage" (DNE) zone is determined around each of the friendly sites and an "Allowable Engagement" (AE) zone is established around each of the enemy sites, wherein none of the AE zones overlap any of the DNE zones. An engagement plan is then determined based on the AE zones and integrity bounds on candidate munitions. The system includes a processing and communications network and a sensor element in communication with the processing and communications network. The system also includes a command control element in communication with the processing and communications network and an operating elements section in communication with the processing and communications network.

U.S. Pat. No. 6,985,929, issued Jan. 10, 2006, to Wilson et al, discloses a distributed object-oriented geospatial database system and method thereof over the Internet using Web-based technology to perform data-driven queries, such as retrieving, viewing and updating, geospatial data of the object oriented geospatial database, such as vector, raster, hypertext and multimedia data, including data types or formats of ESRI shape files, GSF, oceanographic ASCII text data by NAVOCEANO and geospatial data with temporal information and supporting 3D display of the geospatial data. The object-oriented geospatial database system is implemented in a heterogeneous object-oriented development and integration environment through the Common Object Request Broker Architecture (CORBA).

U.S. Pat. No. 7,030,780, issued Apr. 18, 2006, to Shiomi et al, discloses a method for displaying aircraft positions, which is capable of effectively avoiding the occurrence of near miss or collision. The method displays the terrain of an air space under air traffic control apparently in three dimensions on a display screen, displays aircraft marks at positions on the display screen so as to correspond to the three-dimensional positions of the respective aircraft, and displays a warning mark when a distance between two aircraft is shorter than a threshold value, wherein the warning mark comprises a triangle having three apexes, which comprise the aircraft marks, and a position that is apart from the aircraft mark of one of the aircraft along a vertical line extending perpendicular to the one aircraft toward a ground surface of the terrain by a distance corresponding to an altitude difference between both aircrafts on the display screen. A certain warning mark may be displayed when protective air spaces for both aircraft are predicted to conflict each other based on flight trajectories and flight conditions.

U.S. Pat. No. 7,047,114, issued May 16, 2006, to Rogers, discloses a modular computer and telecommunications system for automatic continuous real-time monitoring, tracking, navigation and proactive warning for one or more private and commercial marine vessels and for automatically controlling their navigation within a specific region. The disclosed system and apparatus employs intelligent display, GPS, and transceiver/modem devices on marine vessels that are underway, anchored or docked to routinely transmit the vessels ID, GPS and status data to a supervisory fail-safe computer server. The server's resident relational database contains both pre-entered static information about all vessels having similar on-board devices, as well as dynamic information (such as coordinate data relating to rough seas, severe weather, GPS data for all participating vessels, underwater hazards, fog, etc.). Applications software in the fail-safe server conducts an 'around-the-clock' continuous and automatic real-time comparison of the received vessel parameters with the static and dynamic information stored its relational database. Should the comparison and control algorithm detect any threatening or off-normal situations, such as approaching participating vessels in fog/darkness, severe weather, etc. the server transmits an outgoing packet of information containing a proactive warning via digital wireless to the appropriate participating vessels' GPS Display/transceiver/modem devices. The software within each device will enable appropriate audible message displays and/or graphic image warnings for participating vessels in the region, as well as provide waypoints/magnetic compass headings for autopilots. The system fail-safe server also automatically responds to a keypad integral with the device for Maydays and operator non-emergency queries, such as the ID, speed, direction, of nearby vessels, weather, etc.

U.S. Patent Publication No. 2003/0078706, published Apr. 24, 2003, to Larsen, discloses a method for determining absolute position under water of a submersible vessel (1) having a dead reckoning navigation system and receiving acoustic signals from a reference station (19), signals are received from one reference station in several positions (15-18) of the vessel. Estimated absolute positions of the vessel are calculated using range data and relative position data. Range rate derived from the signals are preferable utilized. In a method for scanning an underwater survey area, the absolute position of a vessel (1) is intermittently being determined according to said method. The reference station may be placed at a fixed absolute position (19), or on the surface of the water, preferably in a buoy or a vessel. A system for determining the absolute position under water of a vessel comprises: acoustic communication means in a reference station and on board the vessel; a dead reckoning navigation system on board the vessel; and computing means.

U.S. Patent Publication No. 2004/0006424, published Jan. 8, 2004, to Joyce et al, discloses a control system for dynamically tracking and targeting multiple targets wherein the targets have position sensors and communicate to with central location that uses the information to process projected locations of moving targets. The system uses several means to smooth the track and to deal with missing or degraded data, wherein the data may be degraded in either time or location. The present system can use a combination of Kalman filtering algorithms, multiple layers of smoothing, decoupled recording of predicated positions and use of those predications along with optimization of speed of apparent target motion to achieve a degree of time on target.

U.S. Patent Publication No. 2004/0008253, published Jan. 15, 2004, to Monroe, discloses a data collection and distribution system for monitoring aircraft in flight, on the ground and at the gate or terminal for monitoring critical and catastrophic events, managing the emergency during such an event, and for investigating the event. The system generates, transmits and collects critical data generated by monitoring equipment onboard an aircraft or other commercial transport and selectively displays the data on a cockpit display console as well as for downloading, transmitting and displaying data at external monitoring and response stations, including fixed ground stations, roving ground stations and chase aircraft or vehicles. Digital surveillance information is collected, processed, dispatched, and log via remote control and access. The system includes a variety of system appliances such as surveillance cameras, sensors, detectors, and panic buttons and accommodates legacy equipment. Within the commercial transport, the system maybe hardwired or may use wireless transmission and receiving systems.

U.S. Patent Publication No. 2004/0015274, published Jan. 22, 2004, to Wilkins, Jr. et al, discloses a flight guidance system providing perspective flight guidance symbology using positioning and terrain information provides increased pilot situational awareness of an aircraft. The guidance system uses a positioning system and a detailed mapping system to provide a perspective display for use in an aircraft. A Perspective Flight Guidance (PFG) symbology set is thereby displayed on a pilot display. The PFG symbology set includes broken line symbols representing an open tunnel and providing flow field data, a half-bracket symbol to indicate that the aircraft is no longer in the open tunnel represented by the broken line symbols and a quickened flight path vector (QFPV) symbol to provide the pilot with predictive flight path information.

U.S. Patent Publication No. 2005/0125141, published Jun. 9, 2005, to Bye, discloses a navigation system with resume logic and mode logic provides as an output an accurate navigation solution using multiple RF sensors. The resume logic determines which sensors are currently providing good data to the navigation system. The mode logic selects an operating mode of the navigation system and selects which data to use for calculating corrections to the navigation solution. The mode logic makes the selections based on the results of the resume logic. The resume logic continues to test data from the sensors. If a sensor that has previously provided erroneous data starts providing good data, the mode logic will automatically select that data for use in calculating the corrections to the navigation solution. The tracking of RF transmitters by the multiple RF sensors is controlled using a plurality of available inertial and non-inertial sensors.

U.S. Patent Publication No. 2005/0143902, published Jun. 30, 2005, to Soulchin et al, discloses a computer-implemented method of displaying traffic conditions on a road system includes creating a 3D graphical map of the road system that includes one or more segments. The status of at least one of the segments on the 3D graphical map is determined. The status of the segment corresponds to traffic data associated with that segment. A 3D model of the road system is created by combining the 3D graphical map and the status of that segment.

U.S. Patent Publication No. 2005/0187677, published Aug. 25, 2005, to Walker, discloses a Protected Primary Focal Node PFN that is a Trusted Remote Activity Controller TRAC and mobile communication router platform that provides accountable remote and robotics control to transportation vehicles by interfacing with the vehicles E/E systems. It connects each vehicle either on the earth's surface or near the earth's surface with application specific intranets for air, sea and land travel, via either host commercial servers or agency providers through wireless communication gateways and then further interfaces these vehicles in a larger machine messaging matrix via wireless and IP protocols to further coordinate movement assess and manage equipment use and impact on the world resources, societies infrastructure and the environment. This filing focuses directly on PFN/TRAC System use to augment and upgrade public safety and security in the Airline Industry and restrict any unauthorized use of an aircraft. Additionally, this application and related filings teaches the PFN/TRAC System™ use for all vehicle platforms to increase safety and security in a free society like the United State of America. The other related filings instruct in the technology's use for robust and accountable remote control for personal applications, stationary equipment and standalone functions, and coordinates them and interfaces them within the communication matrix. The TRAC controller also performs translation and repeating functions across a wide variety of communication protocols to complete a more mobile flexible matrix or web. This connected communication matrix of computers and humans provides an enhanced Human Machine Interfacing HMI scenario both locally and systemically in real-time for improve equipment management and world stability.

The above cited prior art does not disclose means for visualizing an underwater tactical situation utilizing the uncertain types of data discussed above that are typically available within a submarine. Consequently, those skilled in the art will appreciate the present invention that addresses the above and other problems.

SUMMARY OF THE INVENTION

It is a general purpose of the present invention to provide an improved three-dimensional tactical display.

An object of the present invention is to provide an improved underwater three-dimensional tactical viewer that may be utilized to display multiple moving threat containment regions.

Another object of the present invention is to provide an improved display that may be utilized to reduce the size of a plurality of threat containment regions.

Accordingly, in one possible embodiment, the present invention provides a method for displaying underwater tactical data. The method may comprise steps such as, for instance, inputting bathymetry data defining an underwater bottom to a three-dimensional viewer program and/or inputting icons for an ownship and other vehicles. Other possible steps might comprise providing a feeder program for collecting and inputting position and track data for said ownship to said three-dimensional viewer. Said feeder program may be independent from said three-dimensional viewer program in the sense that it could be operated with other viewer programs and does not require the viewer program for operation. The feeder program may be utilized for locating, collecting, and inputting position and track data for the ownship and/or inputting position and track data for the other vehicles based on contact information. The feeder program may utilize a list of sources for its functioning.

In the same or another embodiment, the method might comprise utilizing the feeder program for locating, collecting, and inputting a plurality of threat containment regions wherein each of the plurality of threat containment regions is defined in terms of a probability of at least one threat being located therein. The threat containment regions may represent one or more of the other vehicles especially when data is too uncertain to provide a position or a precise track. The information may comprise solutions produced by the submarine's combat fire control system which are available to the feeder program. The feeder might be used to implement the synchronizing of time with respect to the position and track data and the plurality of threat containment regions.

The method may preferably comprise providing a display and/or displaying selected of the inputted information. In the same or another embodiment, the method might comprise controlling the display with respect to an angle of view of a viewer and/or controlling the direction of time of movement of action for the displayed information.

The method might further comprise reducing a volume of the plurality of threat containment regions by detecting intersections thereof. In the same or another possible embodiment, the method might further comprise providing programming responsive to controls for reducing the plurality of threat containment regions due to the intersections. The method might further comprise selecting the angle of the view to control the intersections prior to and/or after the step of reducing the volume of the plurality of threat containment regions.

In the same or another embodiment, the present invention may provide a system for displaying underwater tactical data. Elements of the system might comprise a display and a feeder program. In one possible embodiment, the feeder program may comprise instructions for reading in and maintaining a time synchronization for combat fire solutions. The combat fire solutions may comprise a plurality of threat containment regions and/or tracking information and/or position information based on a plurality of contacts for a plurality of vehicles. Each of the plurality of threat containment regions may be defined in terms of a probability of at least one threat being located therein.

A three-dimensional viewer program may be utilized to provide images on the display. The three-dimensional viewer program may be operable to display bathometry information and an ownship position relative to the bathometry information. The three-dimensional viewer program may be operable to determine what portions of the plurality of threat containment regions and/or the tracking information and/or position information are to be displayed based on an angle of view. A visual control interface may be utilized for selecting the angle of view and to control time in a forward or reverse direction. In one possible embodiment, the system may further comprise a reduction algorithm operable to reduce a size of the plurality of threat containment regions.

The system may further comprise that the reduction algorithm is operable in conjunction with use of the visual control interface. The system may further comprise a shared memory for the visual control interface and the three-dimensional viewer program.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, wherein like reference numerals refer to like parts and wherein:

The FIGURE is a block diagram schematic showing a three-dimensional underwater tactical display in accord with one possible embodiment of the present invention.

DETAILED DESCRIPTION OF THE INVENTION

The present invention may be utilized to allow for an arbitrary combination of AOUs and the extraction of their intersecting regions to thereby derive potentially reduced AOUs or threat containment regions. The ability to rapidly reduce a plurality of threat containment regions in real time through the use of visualization and/or combination/reduction software features of the invention is very useful.

Referring now to the drawings and more specifically to the FIGURE, there is shown a block diagram of three-dimensional tactical display system 10 in accord with one possible embodiment of the present invention.

Feeder 12 is a module that converts data from a wide variety of data sources 16 into a format that can be utilized by three-dimensional viewer 14. Data sources 16 comprise data sources from both within the submarine combat system database and external to it. The available data sources may comprise a database of the surrounding physical environment, the tract of the submarine, the tracks of other vehicles, and the threat containment regions or areas of uncertainty (AOU) of other vehicles. The data sources may be read into feeder 12 in real time, near real time, or by selection of a time frame, from a wide variety of sources, including the submarine's combat system database, sensors, and/or external databases.

Three-dimensional viewer 14 integrates the tracks, AOUs and the physical environment data. Bezel 18 may be utilized to provide a display and a user interface that controls various aspects of three-dimensional viewer 14. In one application, the bezel is implemented as a window or frame around the display. However, the physical layout of components and controls may be varied as desired and different types of displays and interfaces may be utilized. Bezel 18 may comprise controls to display the data sets available and/or being utilized and to turn various data sets on and off. Bezel 18 may utilize three-dimensional viewer 14 to change the angle of the viewer and to zoom in and out. Another function allows track projection of another vehicle or its AOU at a maximum velocity or other desired velocity in real time or other desired time frame. In one embodiment, controls of bezel 18 may be utilized to find intersections of tracks and AOUs in a manner that may be used to reduce the volume of the AOU or the region of threat. The reduced volume of the AOUs or the region of threat may then be visualized from the same or a different angle.

A possible run sequence of the present invention may be started by executing commands to start the scene manipulation and rendering software of three-dimensional viewer 14. The software of three-dimensional viewer 14 may then load an appropriate bathymetry data set, which represents the ocean bottom and/or various subsea features. Icons of various types may be loaded representing various types of vehicles such as the ownship icon (the icon for the submarine itself), other submarines, and ships such as destroyer, tanker, and the like. This type of information may reside in shared memory 20 and/or other memory and/or be initially provided and/or updated by feeder 12.

Feeder 12 may comprise software which feeds the location of the ownship and contacts which may include tracking and AOU files. A feeder list or directory of where to find files may be utilized by feeder 12. The feeder list may comprise ownship tracking, target tracking, and the like. Feeder 12 may also merge all inputted tracks and timed events, creating track and event lists. The event lists may comprise times when significant events occur, which in this version of the software, may typically mean vehicle and contact movement. Feeder 12 uses the event list to provide real-time movement of the objects in the scene based upon inputted times in the event lists. Establishing communication links between feeder 12 and 3-D viewer 14 may comprise creation and maintenance of TCP/IP communication sockets 22 or other types of connections. In one possible embodiment, feeder 12 opens and closes the communication sockets 22. Communications between feeder 12 and 3-D viewer 14 may comprise commands and contact events such as updated contact events.

3-D viewer 14 may or may not comprise commercial 3-D software, and may be selected to meet fleet requirements for cross computer platform compatibility. In one possible embodiment, commercially available OPEN INVENTOR™ software is utilized with MOTIF™ to provide a 3-D viewer 14 in accord with the present invention. The Open Software Foundation (OSF) X-Window enhanced widget system is called MOTIF™ and is commonly used by many software packages. On the other hand, feeder 12 is self-contained and does not require MOTIF™ for operation.

Three-dimensional viewer 14 provides scene manipulation, camera manipulation, and the like. Three-dimensional viewer 14 is fed information by the software of feeder 12, whereupon three-dimensional viewer 14 reacts to track/AOU information. Based upon the attributes of the observed tracks/AOUs, such as their locations with respect to each other and the angle of the viewer, three-dimensional viewer 14 determines the observable classes or what is and what is not to be displayed.

Bezel 18 controls may be utilized to manipulate this information. Also based upon these attributes, track/AOU labels and positional information may be sent from 3-D viewer 14 to bezel 18. Data presented may be stored in shared memory 20 or other memory whereupon bezel 18 may be utilized for replay, or to change an angle of view. In one embodiment, controls of bezel 18 are utilized to find intersections of tracks and AOUs in a manner that may be used to reduce the volumes of the AOUs or the regions of threat. Bezel 18 may utilize three-dimensional viewer 14 to change the angle of the viewer and to zoom in and out. Another bezel control may allow track projection of another vehicle or its AOU at a maximum velocity or other desired velocity in real time or other desired time frames.

Feeder 12 reads in and maintains a time sync for all the combat fire control solutions that produce AOUs, contacts, tracks, and the like. Thus, feeder 12 interfaces with data sources 16 which may comprise fire control solution information such as, for example, probability information for a plurality of 3-D threat containment regions. In some cases, feeder 12 will not be continuously transmitting information whereupon 3-D viewer loops wait for more information. The previously supplied information may be stored in shared memory 20 for additional viewing, study, and manipulation.

While an embodiment of the invention is especially suitable to an underwater environment, it could also be adapted to other types of environments.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A system for displaying underwater tactical data, comprising:
   a display;
   a feeder program comprising instructions for reading in and maintaining a time synchronization for combat fire solutions comprising a plurality of threat containment regions and tracking and position information based on a plurality of contacts for a plurality of vehicles, each of said plurality of threat containment regions being defined in terms of a probability of at least one threat being located therein;
   a three-dimensional viewer program comprising instructions to provide images on said display, said feeder program being operable independently from said three-dimensional viewer program, said three-dimensional viewer program being operable to display bathometry information and an ownship position relative to said bathometry information, said three-dimensional viewer program being operable to determine what portions of said plurality of threat containment regions and said tracking and position information are to be displayed based on an angle of a view of a viewer; and
   a visual control interface for selecting said angle of view and to control time in a forward or reverse direction;
   a reduction algorithm operable to reduce a size of said plurality of threat containment regions in conjunction with use of said visual control interface.

\* \* \* \* \*